(12) United States Patent
Rylewski (10) Patent No.: US 6,860,322 B1
(45) Date of Patent: Mar. 1, 2005

(54) DEVICE FOR HEAT TRANSFER BETWEEN TWO WALLS

(76) Inventor: Eugeniusz Rylewski, 43 Bis, Avenue du General Leclerc, Saint Remy les Chevreuse (FR), F-78470

(*) Notice: Subject to any disclaimer, the term of this patent is extended or adjusted under 35 U.S.C. 154(b) by 32 days.

(21) Appl. No.: 10/088,303

(22) PCT Filed: Sep. 20, 2000

(86) PCT No.: PCT/FR00/02608

§ 371 (c)(1),
(2), (4) Date: Jul. 20, 2002

(87) PCT Pub. No.: WO01/23812

PCT Pub. Date: Apr. 5, 2001

(30) Foreign Application Priority Data

Sep. 28, 1999 (FR) .......................................... 99 12080

(51) Int. Cl.[7] ............................................. F28D 15/00
(52) U.S. Cl. ............... 165/104.28; 165/96; 165/104.11; 165/104.34; 165/135
(58) Field of Search ................. 165/104.11, 104.19, 165/104.34, 104.28; 126/638, 639

(56) References Cited

U.S. PATENT DOCUMENTS

| | | | | |
|---|---|---|---|---|
| 3,933,198 A | * | 1/1976 | Hara et al. .................. | 165/272 |
| 4,137,964 A | * | 2/1979 | Buckley ...................... | 165/287 |
| 4,149,589 A | * | 4/1979 | Hopman ...................... | 165/276 |
| 4,294,229 A | * | 10/1981 | Maloney ...................... | 126/639 |
| 4,346,693 A | | 8/1982 | Wagner et al. ............... | 126/434 |
| 4,411,255 A | * | 10/1983 | Lee ............................. | 126/618 |
| 4,437,456 A | * | 3/1984 | Merrigan ..................... | 126/637 |
| 4,540,042 A | * | 9/1985 | Zelek et al. .................. | 165/96 |
| 4,615,381 A | * | 10/1986 | Maloney ...................... | 165/48.2 |

FOREIGN PATENT DOCUMENTS

| | | |
|---|---|---|
| DE | 380946 B | 12/1985 |
| FR | 2578312 | 9/1986 |

OTHER PUBLICATIONS

Chen, et al., "Application of the Thermal Diode Concept for the Utilization of Solar Energy", 1996 IEEE, XP-000701516, pp. 1709-1714, Publication Date: Aug. 11, 1996.

* cited by examiner

Primary Examiner—Allen J. Flanigan
(74) Attorney, Agent, or Firm—Staas & Halsey LLP (57) ABSTRACT

The invention concerns a heat transfer device comprising an insulating module (12) designed to be inserted between a first wall (14) and a second wall (16) to define a closed loop wherein flows a heating medium (FC) which comprises a first channel (28) extending substantially vertically along the first wall (14) and a second channel (30) extending substantially vertically along the second wall (16), the first channel and the second channel being mutually offset in the vertical direction to define a low channel and a high channel, as well as an upper channel (32) and a lower channel (34) linking the first channel and the second channel, such that heating medium (FC) flows freely or is blocked naturally in the loop when on the basis of the respective temperatures of the high channel and the low channel. The invention is particularly useful for heating or cooling buildings.

14 Claims, 10 Drawing Sheets

DEVICE FOR HEAT TRANSFER BETWEEN TWO WALLS

BACKGROUND OF THE INVENTION

1. Field of the Invention

The invention relates to a device for heat transfer between a first wall and a second wall, which are respectively in contact with a first thermal mass and a second thermal mass.

2. Description of the Related Art

Devices of this type are already known which are used in particular for transferring heat between a wall capable of being heated by solar radiation and another wall, such as a wall of a building for example, a water reservoir etc. In this case, one of the thermal masses is the external ambient air, whereas the other thermal mass is the building, reservoir, etc.

In this special application, such devices must be able to transfer the heat originating from solar radiation to the wall to be heated, whilst preventing a thermal transfer in the opposite direction when the solar radiation has stopped.

The known devices do not always make it possible to solve all the situations that arise in practice and are generally limited to the heating of one wall and one associated thermal mass on the basis of solar radiation and thermal insulation of this thermal mass when the solar radiation has stopped.

There are also other situations for which it would be desirable to cool the thermal mass in question.

Therefore there is a need to procure a device for heat transfer which is capable of responding to different situations in order to permit in particular either heating or thermal insulation, or on the other hand cooling or thermal insulation.

SUMMARY OF THE INVENTION

The invention proposes to this end a device for heat transfer of the type mentioned in the introduction, which comprises an insulating unit capable of being interposed between the first wall and the second wall in order to define a closed loop for the circulation of a heat-exchanging fluid, which comprises a first channel extending substantially vertically along the first wall and a second channel extending substantially vertically along the second wall, the first channel and the second channel being staggered with respect to one another in the vertical direction in order to define a 'low channel' and a 'high channel', as well as an upper channel connecting the first channel and the second channel and a lower channel connecting the first channel and the second channel, in such a manner that the circulation of the heat-exchanging fluid is effected naturally in the loop when the low channel is at a higher temperature than the high channel, which permits a heat transfer, and that the circulation of fluid is naturally blocked in the loop when the low channel is at a lower temperature than the high channel, which prevents heat transfer by forming a thermal insulator.

Thus a device for heat transfer is obtained which can be called a 'thermal diode' by analogy with electricity.

This heat transfer device, which has numerous applications, makes it possible by virtue of the configuration of the channels, and in particular of the vertical staggering of the first channel and second channel, to allow or prevent circulation of the heat-exchanging fluid by simple convection movement, and this according to the respective temperatures of the first and second channels.

In other words, the circulation of the heat-exchanging fluid is effected or blocked naturally by the convection of the heat-exchanging fluid.

When the low channel is at a higher temperature than the high channel, the fluid tends to rise naturally from the low channel to the high channel by using the upper channel (which is rising). Then the fluid cools in the high channel, which has a lower temperature, and falls naturally back down to the low channel by the lower channel (which is falling), and so on.

Conversely, when the low channel is at a lower temperature than the high channel, the fluid tends to rise to the high channel and to stagnate in this channel, which is at a higher temperature than the low channel. Due to this stagnation, the high channel is filled with the hot heat-exchanging fluid, which makes it possible to provide thermal insulation to the thermal mass located on the side of the high channel. This gives rise to a phenomenon of temperature stratification, wherein the hottest heat-exchanging fluid stagnates in the upper part of the loop and the coldest heat-exchanging fluid stagnates in the lower part of the loop.

Obviously, such a device has numerous applications, one being the heating, thermal insulation or cooling of buildings.

In one embodiment of the invention, the first channel forms a low channel and the second channel forms a high channel, which makes it possible to effect a heat exchange when the temperature of the first channel is higher than that of the second channel, and to prevent a heat exchange when the temperature of the first channel is lower than that of the second channel.

In another embodiment, the first channel forms a high channel and the second channel forms a low channel, which makes it possible to effect a heat exchange when the temperature of the first channel is lower than that of the second channel and to prevent a heat exchange when the temperature of the first channel is higher than that of the second channel.

In one embodiment of the invention, the device comprises selection means in order to bring the device into either of two states, comprising a first state wherein the first channel is a low channel and the second channel is a high channel, and a second state wherein the first channel is a high channel and the second channel is a low channel.

The result is that one and the same device can be used for example to heat, to cool or to insulate thermally a building.

Thus for example, it is possible with this device to effect, during the winter period, heating of the building during the day by solar radiation, and thermal insulation of the building by night. It is equally possible, during the summer period, to carry out thermal insulation of the building by day and cooling by night, if the external temperature is lower than the internal temperature of the building.

In one embodiment, the device comprises first units configured in the first state and second units configured in the second state, and the selection means comprise means of putting into operation either the first units or the second units.

In another embodiment, the units are configured in one state, and the selection means comprise means of changing over in order to change the units to the other state.

Thus for example, the device may be contrived in the form of a shutter or the like combining one or more units and capable of passing from the first state to the second state, or vice versa, by changing over.

It is also conceivable for the device to comprise blocking means to voluntarily block the circulation of heat-exchange fluid and thus to prevent any heat transfer.

In a preferred application of the invention, the first wall is capable of being exposed to solar radiation, whereas the second wall backs on to a thermal mass to be heated or cooled.

Thus the second wall may be for example the outside wall of a building.

The heat-exchanging fluid is preferably air, but it is possible to use other media, in particular liquids.

The module is formed advantageously of an insulating material. This may be selected in particular from a polymer, a cellular concrete, and a flexible material such as a fabric.

In one embodiment, the unit comprises an insulating core capable of being placed between the first wall and the second wall in order to help define respectively the first channel and the second channel, as well as an upper insulating partition and a lower insulating partition capable of being placed respectively above and below the core in order to help define respectively the upper channel and the lower channel.

DESCRIPTION OF THE DRAWINGS

In the following description, made solely by way of example, reference will be made to the attached drawings, which show.

DESCRIPTION OF THE EMBODIMENTS

Figures 1, 2, 3:
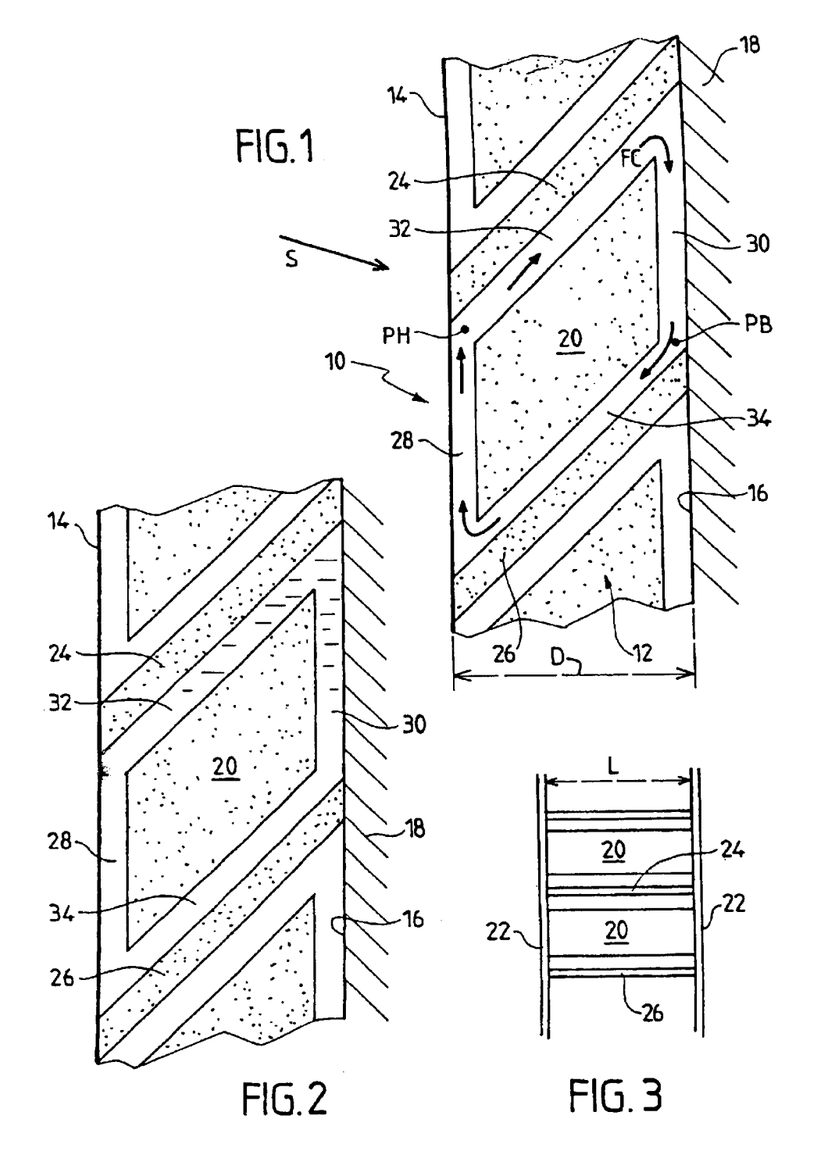
FIG. 1 a view in section of a device according to a first embodiment of the invention operating in heating mode.
FIG. 2 a view corresponding to FIG. 1, showing the same device operating in thermal insulation mode.
FIG. 3 a front view of the device in FIGS. 1 and 2.

FIG. 1 will be referred to first, which shows a device 10 according to the invention comprising an insulating unit 12 capable of being interposed between a first wall 14 and a second wall 16.

In the example, the wall 14 forms an outer wall capable of being exposed to solar radiation S, whereas the wall 16 forms part of a wall 18 of a building. The walls 14 and 16 are substantially vertical and are located at a distance D which may, for example, be between 100 and 200 mm.

The wall 14 may, in its simplest form, consist of a plain sheet of metal, e.g. coated with a black paint.

The unit 12 comprises at least one insulating core 20, which has in straight vertical section substantially the shape of a parallelogram. This insulating core 20 is housed for example between two vertical columns 22 (FIG. 3) forming a frame. This insulating core 20 is placed between the first wall and the second wall, but without coming into contact with them. The unit further comprises an upper insulating partition 24 and a lower insulating partition 26 capable of being placed respectively above and below the core 20. These two partitions 24 and 26 are inclined and extend between the walls 14 and 16.

Obviously the partition 24 forms a lower partition for another insulating core 20 located above and the partition 26 forms an upper wall for another core 20 placed below. The partitions 24 and 26 are also mounted between the columns 22 (FIG. 3).

Obviously, the core 20, the partitions 24 and 26 and the walls 14 and 16 help thus to define a circulation flow as a closed loop. This loop comprises a first channel 28 extending substantially vertically along the first wall 14, and a second channel 30 expending substantially vertically along the second wall 16 (FIG. 1).

These channels 28 and 30 are staggered with respect to one another in the vertical direction in order to define a 'low channel' (in this case the first channel 28) and a 'high channel' (in this case the second channel 30).

The channels 28 and 30 are connected, in the upper region, by an upper channel 32, and in the lower region by a channel 34. These channels 32 and 34 are substantially parallel to one another and are directed upwards from the channel 28 in the direction of the channel 30. Because these channels 28 and 30 are staggered, the channel 28 has a high point PH which is substantially at the same level as the low point PB of the channel 30. Obviously, the high point PH could be at a slightly higher level than the low point PB or even at a slightly lower level than the low point PB.

The channels 28, 30, 32 and 34 are sealing-tight and have a heat-exchanging fluid FC passing through them, which in the example is air. This air may circulate naturally in the channels without any external help, according to the differences in temperature existing between the walls 14 and 16.

In the case of FIG. 1, the device is used in winter and by day to carry out heating of the wall 18 from solar radiation S. The wall 14 and therefore the channel 28 (low channel) are at a temperature higher than the wall 16, therefore of the channel 30 (high channel). The fluid FC is heated in the channel 28 and tends to rise naturally because it becomes lighter, and thus uses the channel 32 which is rising in order to reach the channel 30 along the wall 16. As this wall is at a lower temperature than the wall 14, the fluid cools and tends to fall naturally to pass along the wall 16 and then drop via the channel 34 in order to return to the channel 28 and so on. Provided that the wall 14 is at a higher temperature than the wall 16, the fluid FC circulates naturally in the direction indicated by arrows in FIG. 1 in order to effect a heat transfer which makes it possible to heat the wall 18 by solar radiation S.

In the embodiment shown, the cores 20 and the partitions 24 and 26 are formed of an insulating material which may be for example a polymer (polystyrene, polyurethane etc.) or a cellular concrete, also known as light concrete.

The width L of the cores 20 and of the partitions 24 and 26 may be for example between 50 cm and 5 meters (FIG. 3).

FIG. 2 will now be referred to, which shows the device of FIG. 1 in winter and by night. In this configuration, solar radiation S has stopped and the wall 14 is exposed to the ambient air, which is at a lower temperature than the wall 16 backing on to the wall 18. The result is that the wall 14 forms a cold wall and the wall 16 a hot wall.

Consequently, the fluid FC is heated by the wall 16 and tends to stagnate in the channel 30 located along the wall 16 and in the channel 32, because the channel 30 (high channel) and the channel 32 are located at a higher level than the channel 28 (low channel) and than the channel 34. Thus the circulation of the fluid FC is naturally blocked and prevents a transfer of heat between the walls 14 and 16. The hottest fluid FC stagnates in the upper part of the loop and the coldest fluid FC in the lower part of the loop.

As the hot fluid FC tends to stagnate in the channel 30, this results in the formation of thermal insulation, which considerably decreases the loss of heat.

Obviously, a device for heat transfer is thus obtained which can be termed a 'thermal diode' and which operates naturally, without any external intervention, in order to effect in the winter period day-time heating (FIG. 1) and night-time thermal insulation (FIG. 2).

Figure 4:
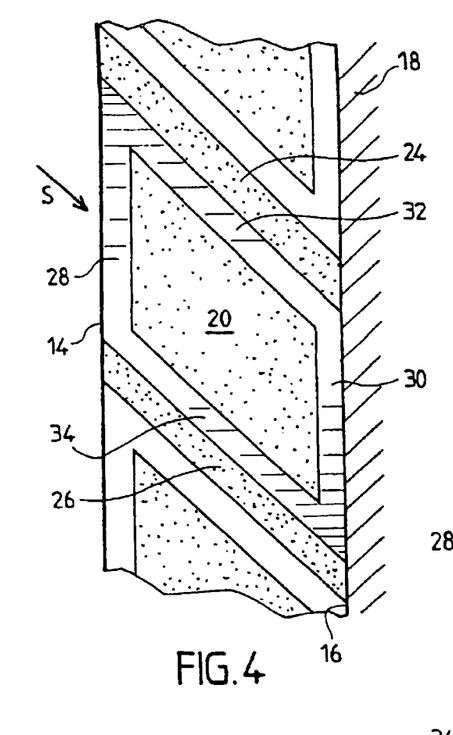
FIG. 4 a view in section of a device according to a second embodiment of the invention, operating in thermal insulation mode.
Figure 5:
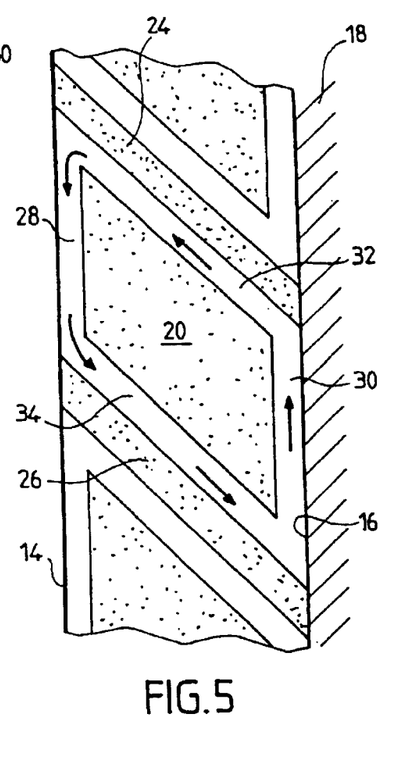
FIG. 5 a view corresponding to FIG. 4, showing the device operating in cooling mode.

FIGS. 4 and 5 will now be referred to, which show another device according to the invention which is related to that of FIGS. 1 and 2, but whose configuration is different.

In fact, in the case of FIGS. 4 and 5, the first channel 28 forms a high channel and the second channel 30 a low channel, such that the upper channel 32 and the lower channel 34 are oriented downwards from the wall 14 to the wall 16. Such a device can be applied, during the summer period, to effect thermal insulation of a building by day (FIG. 4) and cooling of the building by night (FIG. 5).

During the day (FIG. 4), the wall 14 is exposed to solar radiation. Consequently, the fluid FC heats along the wall 14 and tends consequently to stagnate in the upper part of the loop, i.e. in the channel 28 (high channel) and the channel 32. The fluid with a lower temperature tends to stagnate in the lower part of the loop, i.e. in the channel 30 (low channel) and the channel 34, i.e. on the side of the wall 16. Consequently, the circulation of heat-exchanging fluid is blocked naturally and thermal insulation is obtained, since the heat supplied by solar radiation S cannot be transferred to the wall 16. It is advantageous therefore to use, for the wall 14, a white sheet of metal in order to minimize the absorption of heat.

In the case of FIG. 5, the wall 14 is no longer exposed to solar radiation and is at a lower temperature than the wall 16. Consequently, the heat-exchanging fluid tends to circulate naturally, by convection, in the direction indicated by arrows. Thus the fluid FC heats up in the channel 30 (low channel), reaches the channel 28 (high channel) via the channel 32, and then returns to the channel 30 via the channel 34, and so on.

Obviously it is advantageous to be able to have a device according to FIGS. 1 and 2 for the winter period and a device according to FIGS. 4 and 5 for the summer period.

Now, these two devices are symmetrical. It is thus possible to move from the position of FIGS. 1 and 2 to that of FIGS. 4 and 5 by a changeover.

Figure 6:
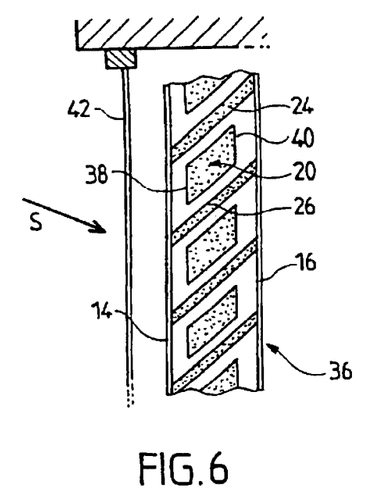
FIG. 6 a view in section of a device according to a third embodiment of the invention, contrived as a shutter brought into a first state.
Figure 8:
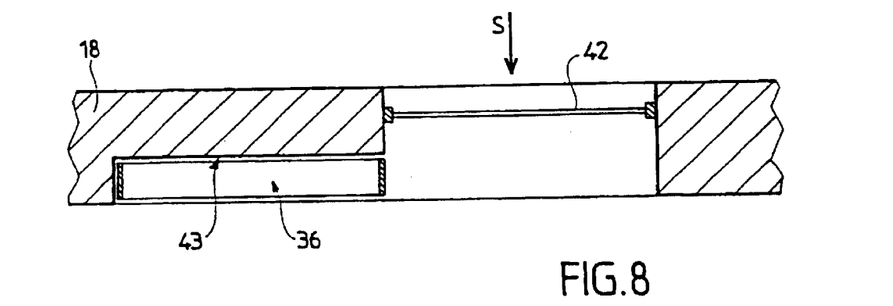
FIG. 8 a view in horizontal section showing a shutter contrived to be sliding in a retracted position.
Figure 9:
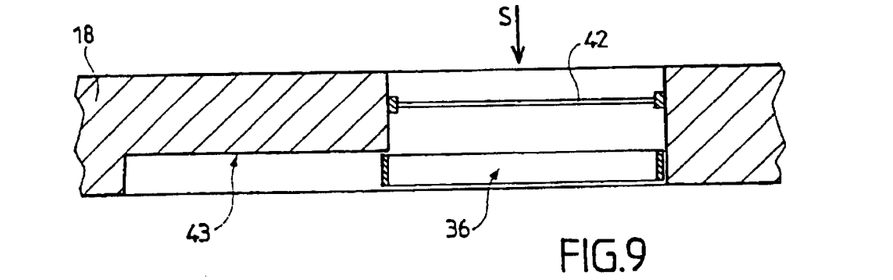
FIG. 9 a view similar to FIG. 8 showing the shutter in the active position.

A convenient way is to realize a shutter or the like as is shown in FIG. 6. This shutter 36 comprises cores 20 alternating with partitions 24 or 26 and disposed between two walls 14 and 16. The wall 14 and the wall 16 can be each formed by a simple glass pane or metal sheet. The wall 14 is black or dark-colored, whereas the wall 16 is white or light-colored. The shutter 36 is placed behind a glass pane 42 of a building, which is exposed to solar radiation S. The shutter can be realized in the form of a horizontally sliding shutter (FIGS. 8 and 9) and capable of retracting into a recess 43 of the wall 18 (FIG. 8) or of being placed behind the glass pane 42 (FIG. 9).

During the winter period, the device is placed in the position shown in FIG. 6 and operates in a similar manner to that of FIGS. 1 and 2 described above.

Figure 7:
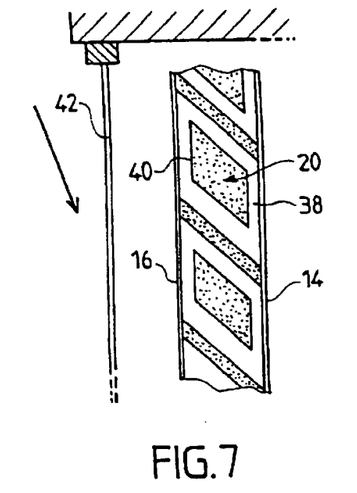
FIG. 7 a view corresponding to FIG. 6 showing the shutter brought into a second state.

During the summer period, the shutter is changed over and is located in the position of FIG. 7, which corresponds to the operation described above for FIGS. 4 and 5. In other words, thermal insulation is obtained by day, and cooling by night. This is favored by the fact that the white surface (wall 16) is now located facing solar radiation S, whereas the black surface (wall 14) is opposite.

Figure 10:
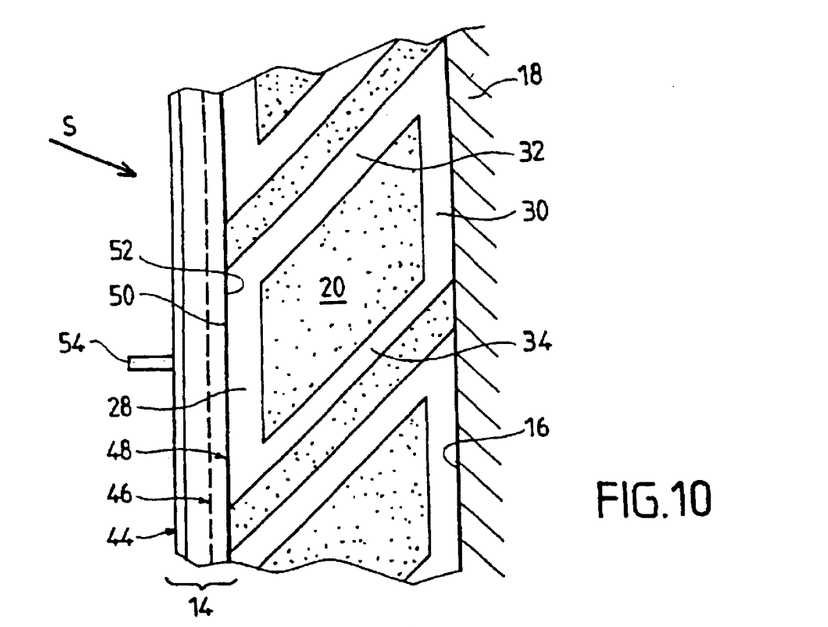
FIG. 10 a view in vertical section of a device according to another embodiment of the invention operating in heating mode.
Figure 11:
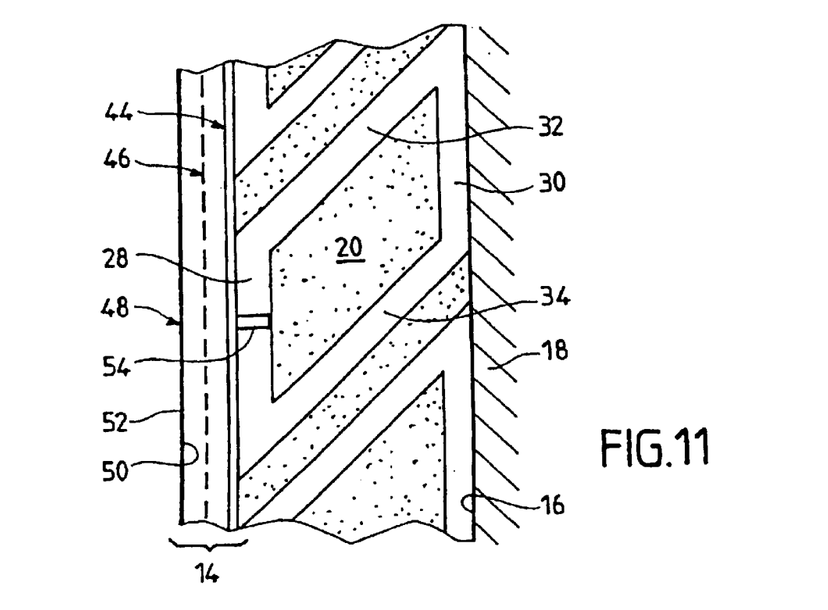
FIG. 11 a view corresponding to FIG. 10 showing the device operating in thermal insulation mode.

Reference will now be made to FIGS. 10 and 11, which show another embodiment of the invention related to that of FIGS. 1 and 2. The main difference resides in the fact that the first wall 14 comprises successively a glass pane 44 exposed to solar radiation, a fabric 46 of glass or plastics material, and a metal sheet 48 having one side coated in black 50 and the other side coated in white 52.

Furthermore, the wall 14 is equipped with a blocking element 54 which, in the position in FIG. 10, is oriented towards the exterior. During the winter period, the device is in the configuration in FIG. 10 and operates in a manner similar to that of FIGS. 1 and 2.

During the summer period, the wall 14 is changed over, so that the blocking element 54 covers the channel 28. Consequently, the circulation of heat-exchanging fluid FC is prevented voluntarily. As a result, the heat-exchanging fluid cannot effect a thermal transfer from the wall 14 exposed to solar radiation to the wall 16 on the side of the wall of the building.

Figure 12:
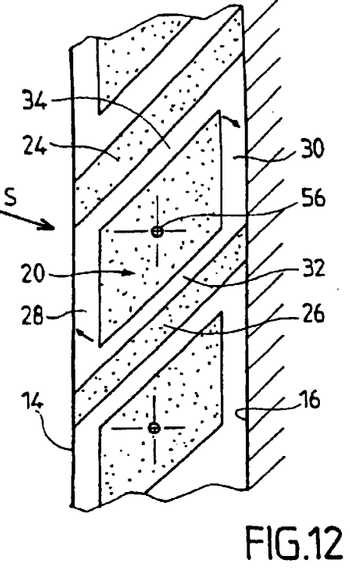
FIGS. 12 and 13 are section views of a device according to the invention comprising blocking means and shown in two different positions.
Figure 13:
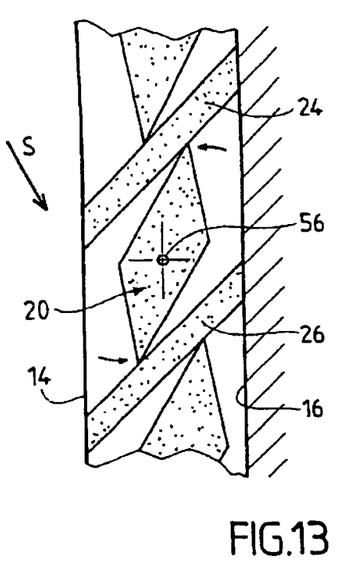

In the embodiment of FIGS. 12 and 13, a device is shown which is related to that of FIGS. 10 and 11. However, the blockage of circulation of the fluid in summer is effected here by rotation of the core 20 about an axis 56.

During the winter period, the core 20 is in the position shown in FIG. 12, i.e. it helps to define the circulation channels in order to effect heating. During the summer period, the core 20 is rotated about its axis so that it comes into abutment with the partitions 24 and 26 in order to block circulation of the fluid in the loop, as is shown in FIG. 13. Thus insulation is effected.

Figure 14:
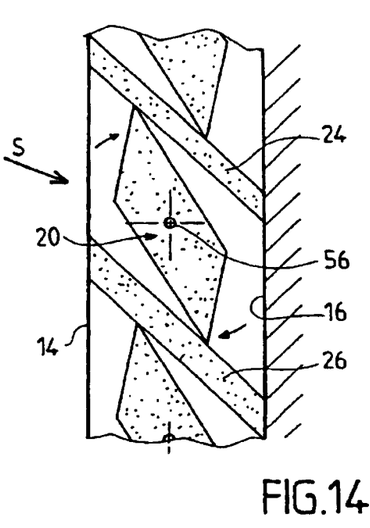
FIGS. 14 and 15 are views corresponding to FIGS. 12 and 13 showing another device comprising blocking means and shown in two different positions.
Figure 15:
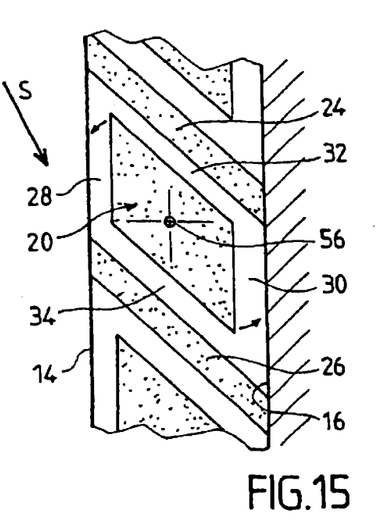

The embodiment in FIGS. 14 and 15 is related to that of FIGS. 12 and 13, with an arrangement according to that of FIGS. 4 and 5. This means that the channel 28 and the channel 30 respectively form the high channel and the low channel. The core 20 is also mounted pivotably about an axis 56. During the summer period (FIG. 15), the core is placed so as to permit circulation of the heat-exchanging fluid, whereas during the winter period (FIG. 14), the core has pivoted in order to block the circulation of fluid in the channels 28 and 30.

Figure 16:
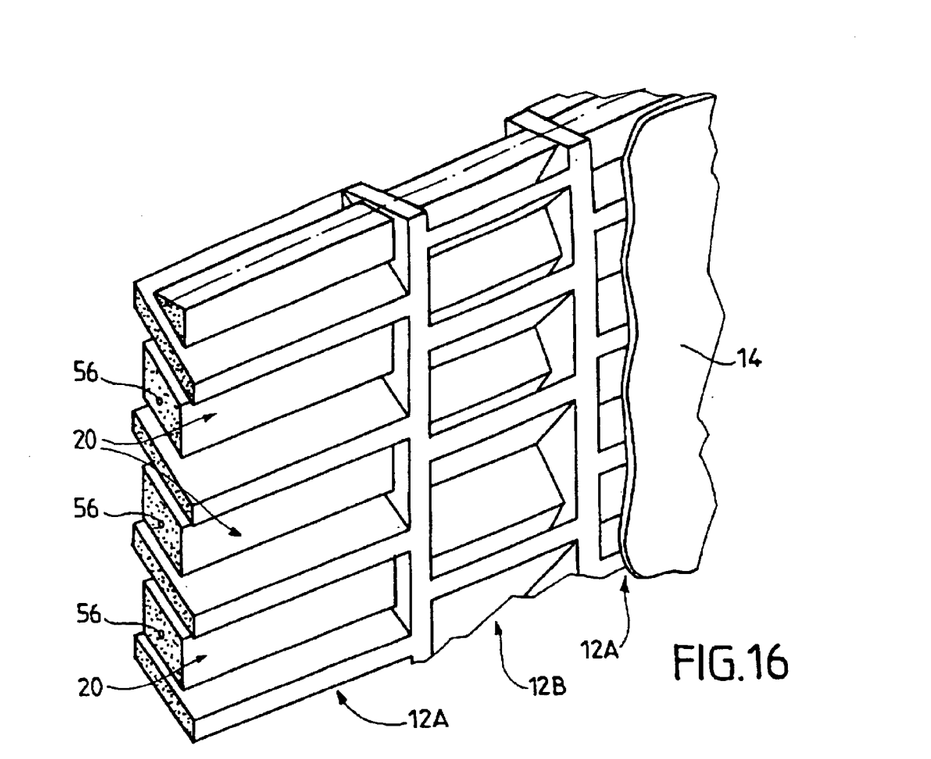
FIGS. 16 and 17 are views respectively in perspective and from the front of a device comprising units according to FIGS. 12 and 13 alternating with units according to FIGS. 14 and 15.
Figure 17:
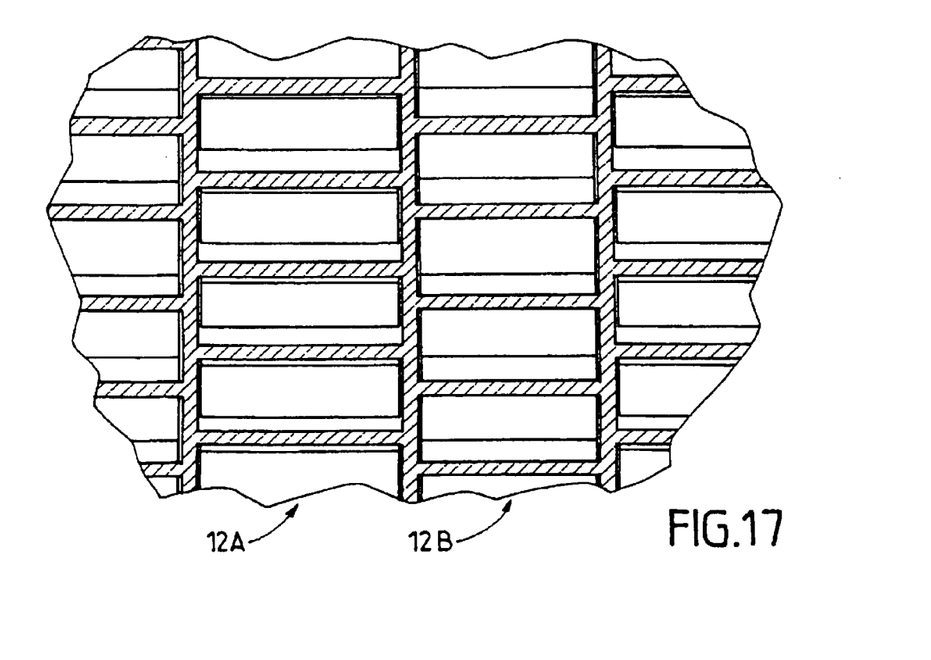

The device according to FIGS. 16 and 17 comprises first units 12a according to FIGS. 12 and 13, which alternate with second units 12b according to FIGS. 14 and 15. These units are aligned and disposed so that the cores 20 can pivot synchronously. In FIGS. 16 and 17, the units 12a are in the winter position for heating (cf. FIG. 12), and the units 12b in the winter position for insulation (cf. FIG. 14). If the cores are pivoted synchronously, the units 12a move into the summer position for insulation (cf. FIG. 13) and the units 12b into the summer position for cooling (cf. FIG. 15).

Figure 18:
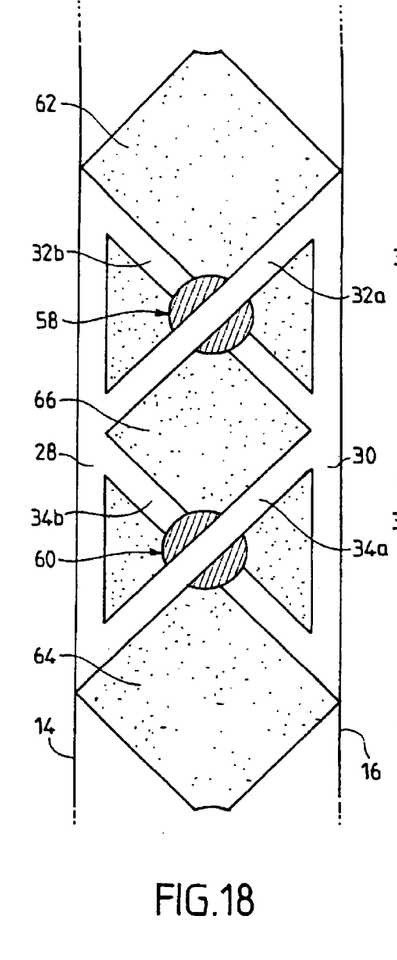
FIGS. 18 and 19 are views in section of a device according to the invention comprising selection means and shown in two different positions.
Figure 19:
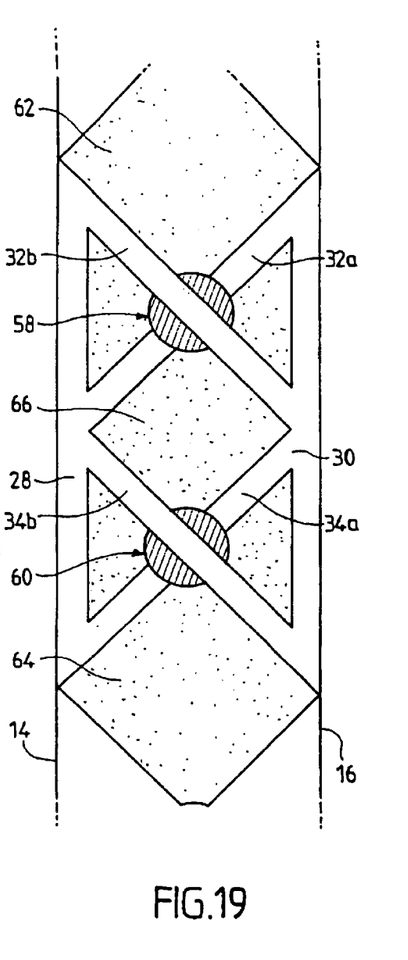

In the embodiment according to FIGS. 18 and 19, the channels 28 and 30 of the device are interconnected by two upper channels 32a and 32b, which intersect at right angles and by two lower channels 34a and 34b which intersect at right angles. At the two intersections thus formed, two selectors 58 and 60 are disposed respectively, each consisting of a four-way rotary valve provided to be actuated synchronously and placed in either of two positions. The above-mentioned channels are defined between the walls 14 and 16 and end cores 62 and 64, and furthermore cross a central core 66.

In a first position, or winter position, shown in FIG. 18, the circulation of the heat-exchanging fluid is allowed in the channels 32a and 34a, which are oriented upwards from the channel 28 to the channel 30 and is blocked in the channels 32b and 34b, which are oriented downwards from the channel 28 to the channel 30. The device thus operations like that in FIGS. 1 and 2.

In a second position, or summer position, shown in FIG. 19, the circulation of the heat-exchanging fluid is allowed in the channels 32b and 34b, and is blocked in channels 32a and 34a. The device thus operates like that in FIGS. 4 and 5.

Figure 20:
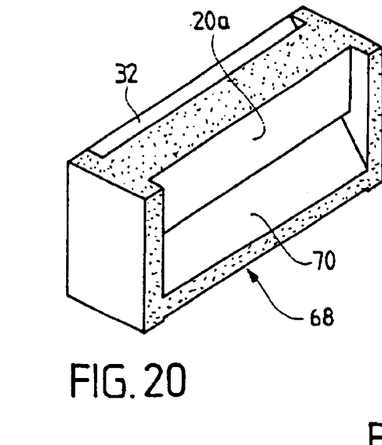
FIGS. 20 and 21 are views respectively in perspective and in section of a device according to the invention realized as a molded block.
Figure 21:
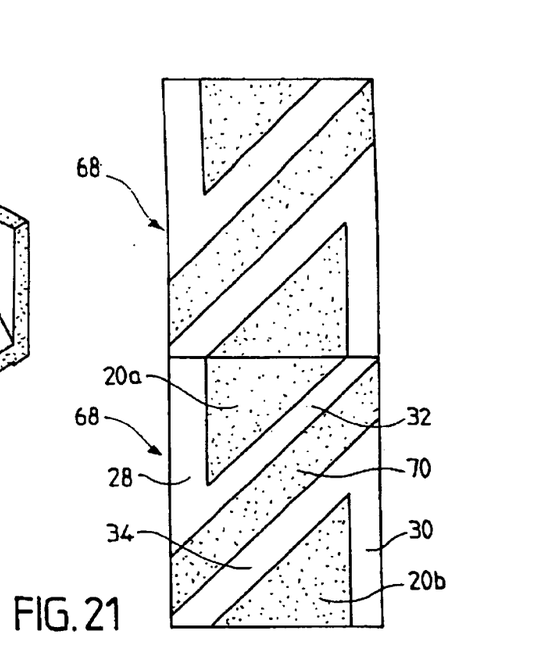
Figure 22:
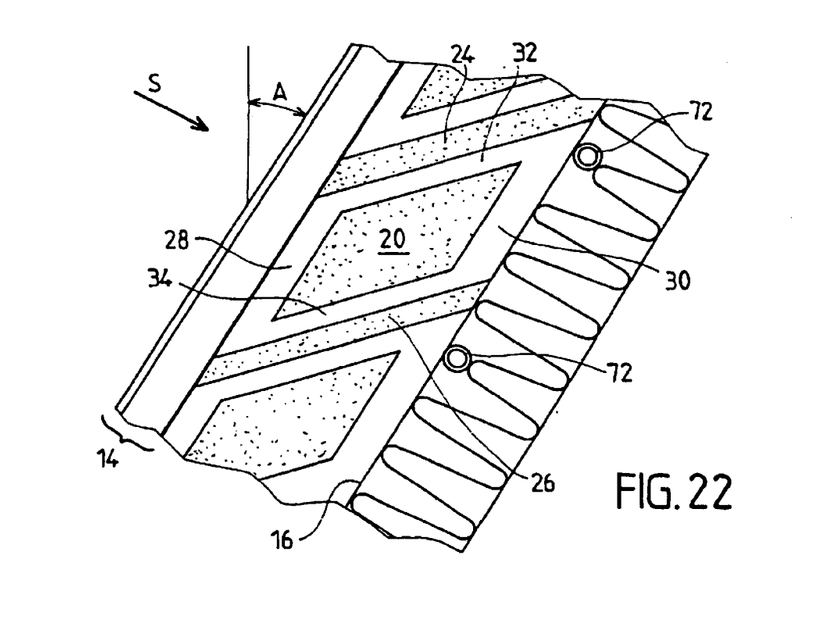
FIG. 22 is a view in section of a device according to the invention used as a solar collector for heating water.

The device in FIGS. 20 and 21 is a block 68 having a general cuboid shape, which is molded from an insulating material, e.g. a plastics material or cellular concrete. It is provided to be able to be stacked vertically with one or more other similar blocks, as is shown in FIG. 21. It comprises two portions of core 20a and 20b, located on either side of an oblique partition 70. It defines two vertical channels 28 and 30 located respectively along two opposite large vertical faces of the block, as well as an oblique channel 32 located above the partition 70 and communicating with the vertical channel 28 and another oblique channel 32 located above the partition 70 and communicating with the vertical channel 30. When the blocks are stacked, a device is formed which is related either to that of FIGS. 1 and 2, or to that of FIGS. 4 and 5, according to whether the channels 28 are disposed on the side of solar radiation or otherwise. FIG. 22 will now be referred to, which shows another embodiment of the invention in which the device is related to that of FIGS. 1 and 2, but which is used to effect the heating of water circulating in the canalizations 72 backing on to the wall 16.

It will also be noted that the walls 14 and 16 are no longer exactly vertical, but are inclined by an angle A of about 30° to the vertical. Here too, as in FIGS. 1 and 2, the channel 28 forms a low channel and the channel 30 forms a high channel. Consequently, the heating of water can be effected under the action of solar radiation, and then the cooling of this water can be prevented by using an insulator when the solar radiation has stopped.

Figure 23:
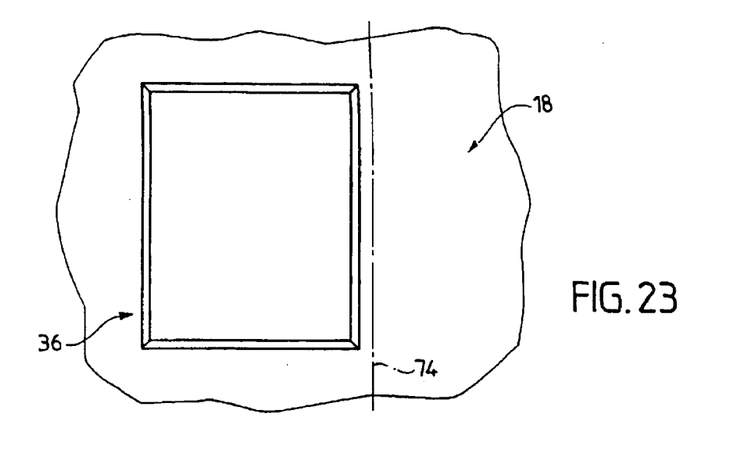
FIG. 23 is a front view of a device according to the invention contrived as a pivoting shutter.

The device according to FIG. 23 is formed as a shutter 36 mounted pivotably about a vertical axis 74, which allows it to adopt two different states, a first state (FIGS. 24A and 24B) corresponding to a 'winter' position and a second state (FIGS. 25A and 25B) corresponding to a 'summer' position. The shutter 36 is capable of pivoting along a wall 18 between the two aforementioned states and is related thus to a shutter having what is known as 'French-style' pivoting.

The shutter 36 is related to that described above with reference to FIGS. 6 and 7. It comprises cores 20 alternating with partitions 24 or 26 and disposed between two walls 14 and 16. The wall 14 is here a black receiving metal sheet placed behind a glass pane 42, whereas the wall 16 is a white metal sheet. In the 'winter' position, the glass pane 42 and the wall 14 are disposed towards the exterior, whereas the wall 16 is disposed towards the interior, i.e. on the side of the wall. In the 'summer' position, the reverse is true.

Figure 24A:
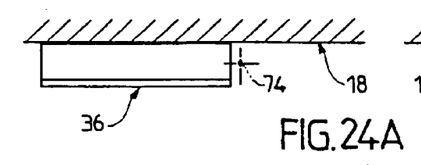
FIG. 24A is a diagrammatic view in horizontal section of the shutter of FIG. 23 brought into a first state.
Figure 24B:
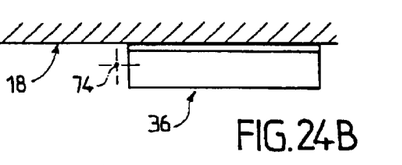
FIG. 24B is a view in vertical section corresponding to FIG. 24A.
Figure 25A:
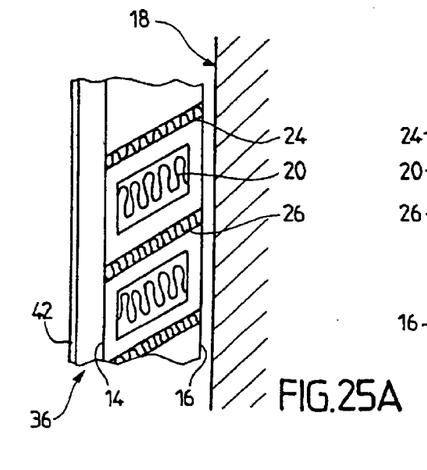
FIGS. 25A and 25B correspond respectively to FIGS. 24A and 24B for a second state of the shutter.
Figure 25B:
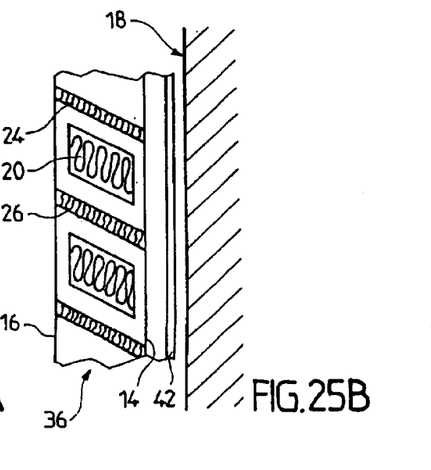

During the winter period, the device is placed in the position according to FIGS. 24A and 24B and operates similarly to that in FIGS. 1 and 2. During the summer period, the shutter is changed over and operates similarly to that in FIGS. 4 and 5.

Figure 26:
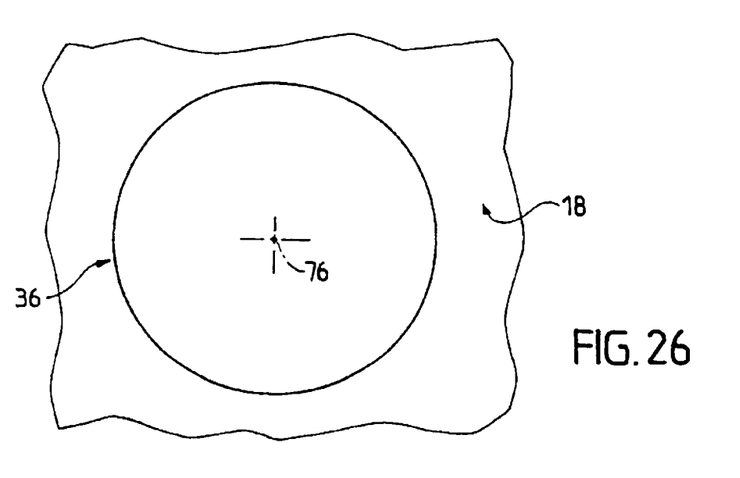
FIG. 26 is a front view of a device according to the invention realized as a rotary element.
Figure 27:
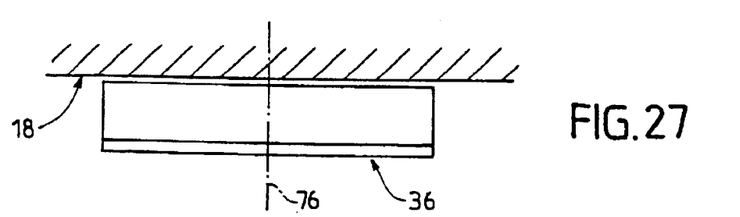
FIG. 27 is a view in horizontal section of the device in FIG. 26.

The device in FIGS. 26 is realized as a wheel-shaped element 36, which is mounted pivotably about an axis 76 perpendicular to a wall 18. As in the previous embodiment, the device comprises cores 20 alternating with partitions 24 or 26 and disposed between two walls, notably an outer wall 14 which is here a black metal sheet and an inner wall 16, which is here a black metal sheet. A glass pane 42 is disposed on the outside.

Figure 28A:
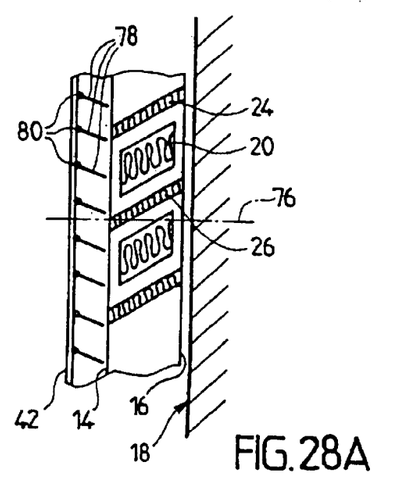
FIG. 28A is a view in vertical section of the device in FIGS. 26 and 27 in a first state.
Figure 28B:
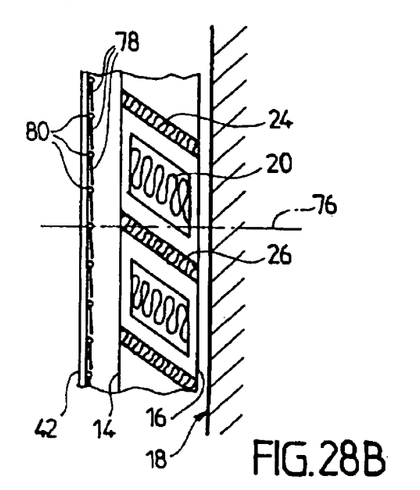
FIG. 28B is a view corresponding to FIG. 28 for a second state of the device.

Between the glass pane 42 and the wall 14 is provided a series of mobile plates 78 each articulated about a horizontal axis 80 placed behind the glass pane 42. These plates are white in color and are capable of pivoting according to the position of the shutter 36. In a first state (FIG. 28A) corresponding to a winter position, the plates 78 are inclined according to the position of the sun and allow the sun's rays to fall on the metal sheet 14. In a second state (FIG. 28B) corresponding to the summer position, the plates 78 pivot in a vertical manner and are thus applied to the rear of the glass pane 42, thus preventing the sun's energy from penetrating into the wall.

Obviously, the invention is not limited to the embodiments described above by way of example, and may have other applications besides the heating, cooling and insulation of buildings. Thus it is possible to effect, with such a device, the heating of an oven (solar oven), the heating of a swimming pool, of a greenhouse, etc. It is also possible to obtain thermal insulation for refrigeration units.

In all cases, a kind of 'thermal diode' is formed, which allows or prevents circulation of the heat-exchanging fluid consisting of air in a natural manner, which simplifies the realization of the device.

Furthermore, although the invention has been described with reference to a heat-exchanging fluid formed of air, it is possible to use other media, in particular liquids.

Finally, the realization of the unit or units is open to numerous modifications, in particular in so far as the choice of insulating material is concerned. This may also consist for example of fabrics or the like.

What is claimed is:

1. Device for heat transfer between a first wall and a second wall respectively in contact with a first thermal mass and a second thermal mass, comprising:

an insulating unit capable of being interposed between the first wall and the second wall to define a closed loop for the circulation of a heat-exchanging fluid, and including a first channel extending substantially vertically along the first wall and a second channel extending substantially vertically along the second wall, the first channel and the second channel being staggered with respect to one another in the vertical direction in order to define a low channel and a high channel, as well as an upper channel connecting the first channel and the second channel and a lower channel connecting the first channel and the second channel, wherein the circulation of the heat-exchanging fluid is effected naturally in the loop when the low channel is at a higher temperature than the high channel, which permits a heat transfer, and the circulation of heat-exchanging fluid is naturally blocked in the loop when the low channel is at a lower temperature than the high channel, which prevents heat transfer by forming a thermal insulator, and wherein the insulating unit includes an insulating core placed between the first wall and the second wall to define respectively the first channel and the second channel, as well as an upper partition and a lower partition disposed respectively above and below the core to define respectively the upper channel and the lower channel.

2. Device according to claim 1, wherein the first channel forms the low channel and the second channel forms the high channel, which effects a heat exchange when the temperature of the first channel is higher than that of the second channel, and prevents a heat exchange when the temperature of the first channel is lower than that of the second channel.

3. Device according to claim 1, wherein the first channel forms the high channel and the second channel forms the low channel, which effects a heat exchange when the temperature of the first channel is lower than that of the second channel and prevents a heat exchange when the temperature of the first channel is higher than that of the second channel.

4. Device according to one of claims 1 to 3, further comprising:

a selector for bringing the device into either of two states, including a first state in which the first channel forms the low channel and the second channel forms the high channel, and a second state in which the first channel forms the high channel and the second channel forms the low channel.

5. Device according to claim 4, further comprising:

first units configured in the first state and second units configured in the second state, wherein the selector puts into operation either the first units or the second units.

6. Device according to claim 5, wherein the selector includes a device to change the units over into the other of the two states.

7. Device according to claim 6, further comprising:

a shutter element which groups one or more of the first and second units capable of moving from the first state into the second state, or vice versa, by a changeover.

8. Device according to claim 1, further comprising:

a blocker for blocking voluntarily circulation of the heat-exchanging fluid.

9. Device according to claim 1, wherein the first wall is exposed to solar radiation, whereas the second wall backs on to a thermal mass to be heated or cooled.

10. Device according to claim 1, wherein the second wall backs on to a wall of a building.

11. Device according to claim 1, wherein the heat-exchanging fluid is air.

12. Device according to claim 1, wherein the insulating unit includes an insulating material.

13. Device according to claim 1, wherein the insulating material is selected from one of a polymer, a cellular concrete, and a flexible material.

14. The device as recited in claim 1, wherein the upper and lower partitions are insulative.

* * * * *